United States Patent
Tsuruma et al.

(10) Patent No.: US 11,451,166 B2
(45) Date of Patent: Sep. 20, 2022

(54) POWER CONVERSION DEVICE WITH VIRTUAL POWER GENERATION MODEL

(71) Applicant: TOSHIBA MITSUBISHI-ELECTRIC INDUSTRIAL SYSTEMS CORPORATION, Chuo-ku (JP)

(72) Inventors: Yoshinori Tsuruma, Tokyo (JP); Noriko Kawakami, Tokyo (JP); Yukihisa Iijima, Tokyo (JP); Kentaro Suzuki, Kanagawa (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 205 days.

(21) Appl. No.: 16/771,064

(22) PCT Filed: Dec. 11, 2017

(86) PCT No.: PCT/JP2017/044320
§ 371 (c)(1),
(2) Date: Jun. 9, 2020

(87) PCT Pub. No.: WO2019/116419
PCT Pub. Date: Jun. 20, 2019

(65) Prior Publication Data
US 2021/0194383 A1 Jun. 24, 2021

(51) Int. Cl.
*H02M 7/5395* (2006.01)
*H02J 3/32* (2006.01)
(Continued)

(52) U.S. Cl.
CPC ............. *H02M 7/5395* (2013.01); *H02J 3/32* (2013.01); *H02J 3/38* (2013.01); *H02M 7/53871* (2013.01); *H02J 3/241* (2020.01)

(58) Field of Classification Search
CPC ............... H02M 7/539; H02M 7/5395; H02M 7/53871; H02J 3/12; H02J 3/16;
(Continued)

(56) References Cited

U.S. PATENT DOCUMENTS

2005/0029972 A1* 2/2005 Imai ...................... B60L 15/025
318/400.04
2014/0152110 A1* 6/2014 Sugimoto ................. H02J 3/46
307/66
(Continued)

FOREIGN PATENT DOCUMENTS

JP 2009-225599 A 10/2009
JP 2012-100487 A 5/2012
(Continued)

OTHER PUBLICATIONS

The partial Supplementary European Search Report dated Jun. 2, 2021 in European Patent Application No. 17934523.6, 13 pages.
(Continued)

*Primary Examiner* — Alex Torres-Rivera
(74) *Attorney, Agent, or Firm* — Oblon, McClelland, Maier & Neustadt, L.L.P.

(57) ABSTRACT

A power conversion device includes a power conversion circuit and a control device. The control device includes a virtual power generation device model unit and a control signal generation unit. The virtual power generation device model unit includes: a motor model unit; an AVR model unit; an angular velocity difference acquisition unit; and a power generator model unit. The control signal generation unit is configured to generate the pulse width modulation signal based on the current command value and an output current value from the power conversion circuit.

8 Claims, 9 Drawing Sheets

(51) Int. Cl.
*H02M 7/5387* (2007.01)
*H02J 3/38* (2006.01)
*H02J 3/24* (2006.01)

(58) Field of Classification Search
CPC ...... H02J 3/24; H02J 3/241; H02J 3/28; H02J 3/32; H02J 3/38; H02J 3/381; H02J 3/388; H02J 3/46
See application file for complete search history.

(56) References Cited

U.S. PATENT DOCUMENTS

| | | | | |
|---|---|---|---|---|
| 2015/0112532 | A1* | 4/2015 | Oono | B60L 15/06 |
| | | | | 701/22 |
| 2017/0141709 | A1* | 5/2017 | Fukuda | H02P 7/06 |
| 2017/0237354 | A1 | 8/2017 | Takahara et al. | |
| 2019/0252970 | A1* | 8/2019 | Oh | H02M 1/32 |

FOREIGN PATENT DOCUMENTS

| | | |
|---|---|---|
| JP | 5408889 B2 | 2/2014 |
| WO | WO 2016/063678 A1 | 4/2016 |

OTHER PUBLICATIONS

International Search Report dated Mar. 6, 2018 in PCT/JP2017/044320 filed Dec. 11, 2017, 2 pages.
English translation of the International Preliminary Report on Patentability dated Jun. 25, 2020 in PCT/JP2017/044320 filed Dec. 11, 2017, 9 pages.
Extended European Search Report dated Sep. 2, 2021 in European Patent Application No. 17934523.6, 11 pages.
Office Action dated Jul. 13, 2021 in corresponding Japanese Patent Application No. 2019-559426 (with English Translation), 7 pages.
Indian Office Action dated Dec. 28, 2020 in Indian Patent Application No. 202017023376 (with English Translation), 4 pages.
Hearing Notice issued Mar. 30, 2022 in Indian Patent Application No. 202017023376, 4 pages.

* cited by examiner

POWER CONVERSION DEVICE WITH VIRTUAL POWER GENERATION MODEL

FIELD

The present invention relates to a power conversion device.

BACKGROUND

As disclosed in, for example, JP5408889B, a power conversion device which includes a virtual power generation device model unit in which a generator is modeled has been known. In general, a power conversion device includes an inverter circuit for conversion between a direct current and an alternating current, and a control device that controls the inverter circuit. The virtual power generation device model unit is built in the control device. With the virtual power generation device model unit, the control device can generate a control signal for the inverter circuit such that the output power of the inverter circuit behaves in a manner similar to that of the power generator.

CITATION LIST

Patent Literature

[PTL 1] JP5408889B

SUMMARY

Technical Problem

The virtual power generation device model unit can simulate a phenomenon unique to a power generator, such as an inertial force, which gets insufficient with normal inverter control. The virtual power generation device model unit provides the advantageous effect of, for example, stabilizing the system frequency and system voltage. As with an actual generator including a power generator, an AVR, a motor, and a governor, the conventional virtual power generator model unit also includes a power generator model, an AVR model, a motor model, and a governor model. The aforementioned conventional technique has been devised for processing the amount of fuel supply transmitted between the governor model and the motor model.

However, in practical use, there remain many issues to be improved for modeling the power generator. To explain one of the issues, a power system including a power conversion device is connected to an output line shared with a generator other than the power system for system interconnecting operation. At this time, it is not preferable that there is a too big difference between the frequency of the alternating current (AC) power output from the power generator and the frequency of the output AC power of the power conversion device.

To explain another issue, if a power generator drops out during system interconnecting operation, the power system including the power conversion device needs to start a self-sustaining operation. At this time, it is preferable that switching between the system interconnecting operation and the self-sustaining operation be performed smoothly in terms of control.

To explain still another issue, a direct current (DC) power supply is connected to the input terminal of the power conversion device, and a storage battery is in some cases used as the DC power supply. Unlike a solar cell or a fuel cell which is a DC power generator, with a storage battery, the unique situation arises that the electric energy of the storage battery is limited.

The above-mentioned conventional technique does not take appropriate measures for the aforementioned issues. The inventors of the present application have therefore conducted intensive research on various issues that were not taken into consideration in the aforementioned conventional technique, and have come to find a novel power conversion device with an improvement to dramatically enhance practicality.

A first object of the present application, which has been made to solve the above-described problems, is to provide a power conversion device in which the output AC power frequency of a power conversion circuit can be appropriately controlled.

A second object of the present application is to provide a power conversion device in which switching between a system interconnecting operation and a self-sustaining operation is performed seamlessly.

A third object of the present application is to provide a power conversion device in which limited storage battery power can be effectively used.

A fourth object of the present application is to provide a power conversion device equipped with a virtual power generation device model configured to charge a storage battery as needed.

Solution to Problem

A first power conversion device of the present invention comprises:

a power conversion circuit that is present between a direct current (DC) power supply and an output line and converts DC power from the DC power supply to output alternating current (AC) power to the output line; and a control device that outputs a pulse width modulation signal to the power conversion circuit, the pulse width modulation signal being used for switching control in the power conversion circuit, wherein the control device comprises:
a virtual power generation device model unit; and
a control signal generation unit;
wherein the virtual power generation device model unit comprises:
 a motor model unit configured to simulate a motor having a rotation shaft, and configured to generate a model angular velocity representing a virtual rotational velocity of the rotation shaft;
 an AVR model unit configured to simulate an automatic voltage regulator, and configured to calculate a field equivalent value that is a value equivalent to a field current or a field voltage;
 an angular velocity difference acquisition unit configured to calculate an angular velocity difference that is a difference between an angular frequency of an output voltage of the power conversion circuit and the model angular velocity; and
 a power generator model unit configured to generate a current command value for simulating a power generator driven by the motor, based on the field equivalent value, the angular velocity difference, and an output voltage of the power conversion circuit,
wherein the control signal generation unit is configured to generate the pulse width modulation signal based on the current command value and an output current value from the power conversion circuit.

A second power conversion device of the present invention comprises:
a power conversion circuit that is present between a direct current (DC) power supply and an output line and converts DC power from the DC power supply to output alternating current (AC) power to the output line; and
a control device that outputs a pulse width modulation signal to the power conversion circuit, the pulse width modulation signal being used for switching control in the power conversion circuit,
wherein the control device comprises:
a virtual power generation device model unit configured to output a current command value; and
a control signal generation unit configured to generate the pulse width modulation signal based on the current command value and an output current value from the power conversion circuit,
wherein the virtual power generation device model unit comprises:
a motor model unit configured to simulate a motor having a rotation shaft, and configured to generate a model angular velocity representing a virtual rotational velocity of the rotation shaft;
an AVR model unit configured to simulate an automatic voltage regulator, and configured to calculate a field equivalent value that is a value equivalent to a field current or a field voltage; and
a power generator model unit configured to generate a current command value for simulating a power generator driven by the motor, based on the model angular velocity, the field equivalent value, and an output voltage of the power conversion circuit,
wherein the control signal generation unit is configured to feed back a difference between an output current value of the power conversion circuit and the current command value, to the pulse width modulation signal by feedback control that does not involve an integral gain.

A third power conversion device of the present invention comprises:
a power conversion circuit that is present between a direct current (DC) power supply and an output line and converts DC power from the DC power supply to output alternating current (AC) power to the output line; and
a control device that outputs a pulse width modulation signal to the power conversion circuit, the pulse width modulation signal being used for switching control in the power conversion circuit,
wherein the control device comprises:
a virtual power generation device model unit configured to output a current command value; and
a control signal generation unit configured to generate the pulse width modulation signal based on the current command value and an output current value from the power conversion circuit,
wherein an external power generator is connected to the output line,
wherein the virtual power generation device model unit comprises:
a motor model unit configured to simulate a motor having a rotation shaft, and configured to generate a model angular velocity representing a virtual rotational velocity of the rotation shaft;
an AVR model unit configured to simulate an automatic voltage regulator, and configured to calculate a field equivalent value that is a value equivalent to a field current or a field voltage;
a power generator model unit configured to generate a current command value for simulating a power generator driven by the motor, based on the model angular velocity, the field equivalent value, and an output voltage of the power conversion circuit,
a floating command value generation unit configured to output a floating command value being a command value generated such that a difference between a preset no-load angular velocity command value and the model angular velocity is included in the no-load angular velocity command value with a time delay; and
a governor model unit configured to simulate a governor that adjusts the virtual rotational velocity of the rotation shaft, and configured to calculate an index value that is an index of drive energy supplied to the motor based on the floating command value,
wherein the governor model unit calculates the index value according to the floating command value such that, when supply power supplied from the external power generator to the output line has a predetermined steady value, the power conversion circuit does not output active power, and when the supply power of the output line falls below the steady value due to a decrease in an output of the external power generator, the power conversion circuit continues to output a current corresponding to the decrease in a current from the steady value.

A fourth power conversion device of the present invention comprises:
a power conversion circuit that is present between a direct current (DC) power supply and an output line and converts DC power from the DC power supply to output alternating current (AC) power to the output line; and
a control device that outputs a pulse width modulation signal to the power conversion circuit, the pulse width modulation signal being used for switching control in the power conversion circuit,
wherein the control device comprises:
a virtual power generation device model unit configured to output a current command value; and
a control signal generation unit configured to generate the pulse width modulation signal based on the current command value and an output current value from the power conversion circuit;
wherein the virtual power generation device model unit comprises:
a motor model unit configured to simulate a motor having a rotation shaft, and configured to output a model angular velocity representing a virtual rotational velocity of the rotation shaft;
an AVR model unit that simulates an automatic voltage regulator, and is configured to calculate a field equivalent value that is a value equivalent to a field current or a field voltage; and
a power generator model unit configured to generate the current command value for simulating a power generator driven by the motor, based on an output voltage of the power conversion circuit, the field equivalent value of the AVR model unit, and an angular frequency of an output voltage of the power conversion circuit,
wherein the virtual power generation device model unit is configured to receive a current control signal,
wherein the virtual power generation device model unit is configured to correct the current command value generated by the power generator model unit when receiving the current control signal, thereby transmitting the current command value corrected such that a current flows backward from the output line toward the DC power supply via the power conversion circuit, to the control signal generation unit.

Advantageous Effects of Invention

With the first power conversion device, the angular velocity difference acquired by the angular velocity difference acquisition unit can be included in the current command value generation process. Thus, the frequency of the AC power output from the power conversion circuit can be accurately adjusted while considering the relationship with the frequency of the system power on the output line side.

The second power conversion device provides the following advantageous effects. If the power system drops out of the system interconnecting operation while the power system including the power conversion device and the power system including the power generator are interconnected, the power system including the power conversion device may be operated independently (self-sustaining operation). It has been found that even though the feedback control using the integral gain functions well during the system interconnecting operation, the integral gain reduces the stability of the feedback control during the self-sustaining operation. The second power conversion device, which does not involve the integral gain, provides the advantageous effect of seamless switching between the system interconnecting operation and the self-sustaining operation and stable self-sustaining operation.

With the third power conversion device, backup current control can be accomplished. With backup current control, the power conversion device does not output current when the external power generator is operating normally, and when the output power decreases due to, for example, dropout of the external power generator, the power conversion device keeps replenishing insufficient current. The power stored in the storage battery is limited and the available active power is limited when the power conversion device is connected to the storage battery. With the above-mentioned backup current control, limited storage battery power can be effectively used.

With the fourth power conversion device, current flowing from the power conversion circuit to the DC power supply can be generated according to the current control signal. This current can be used as a charging current for the storage battery when the storage battery is used as the DC power supply.

DESCRIPTION of EMBODIMENTS

First Embodiment

[Configuration of Apparatus of First Embodiment]
(Overall Configuration)

Figure 1:
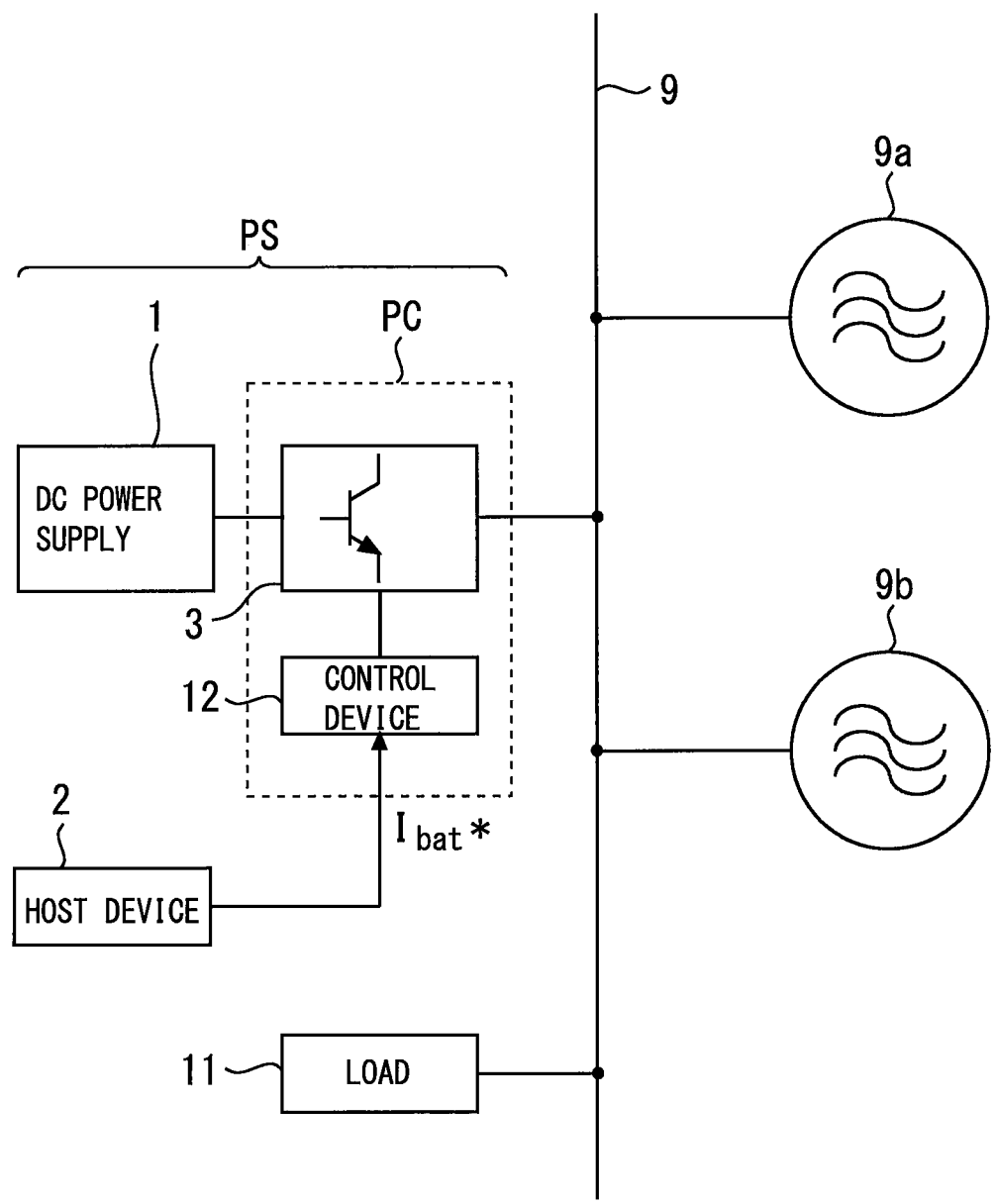
FIG. 1 is a system configuration diagram illustrating an overall configuration including a power system including a power conversion device according to a first embodiment.

FIG. 1 is a system configuration diagram illustrating the overall configuration including a power system PS including a power conversion device PC according to a first embodiment. A power system PS, a first external power generator 9a, a second external power generator 9b, and a load 11 are connected to an output line 9. The power system PS includes a power conversion device PC and a DC power supply 1.

The power conversion device PC according to the first embodiment includes a power conversion circuit 3 and a control device 12. Note that the power conversion device PC is also connected to a host device 2 and is configured to receive a charge/discharge current control signal $I_{bat^*}$ from the host device 2. The first external power generator 9a and the second external power generator 9b are known AC power generators, and constitute a power system. The specific specifications of the first external power generator 9a and the second external power generator 9b are not limited, and may be, for example, a synchronous power generator or an induction power generator, and its power source may be a steam turbine or the like.

In the description of the embodiment and the drawings, "*" is given to some reference numerals: "Id*", "Iq*", and "$I_{bat^*}$". The asterisk is a symbol added to indicate that the parameter is equivalent to a command value or a target value in the control system. An alternative to the asterisk may be to add "ref" which means "Reference" to a subscript to show that a specific parameter is a command value or a target value. In other words, Id*, Iq*, and $I_{bat^*}$ have the same meaning even when written as $Id_{ref}$, $Iq_{ref}$ and $I_{batref}$, respectively.

Figure 2:
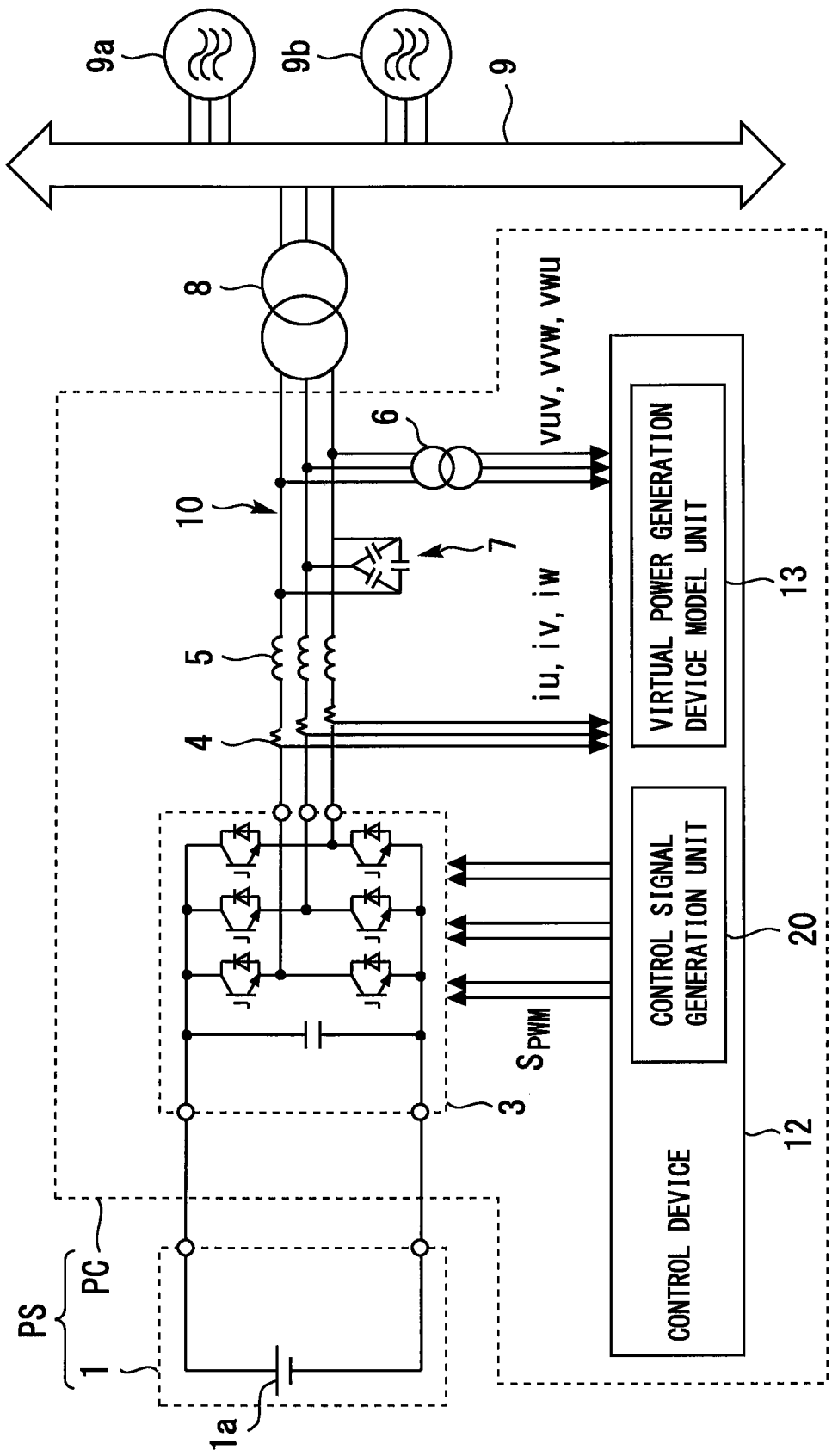
FIG. 2 is a circuit diagram showing a power system including the power conversion device according to the first embodiment.

FIG. 2 is a circuit diagram showing a power system PS including the power conversion device PC according to the first embodiment. The power conversion circuit 3 is present between the DC power supply 1 and the output line 9 and converts the DC power from the DC power supply 1 to output AC power to the output line 9. The power conversion circuit 3 is an inverter circuit including a plurality of semiconductor switching devices. Each semiconductor switching device is an IGBT, a MOSFET, or the like.

The control device 12 outputs a pulse width modulation signal $S_{PWM}$, which is used for switching control in the power conversion circuit 3, to the power conversion circuit 3. The pulse width modulation signal $S_{PWM}$ is a gate pulse signal applied to the gate of the semiconductor switching device. The DC power supply 1 is connected to an input terminal of the power conversion device PC. In the first embodiment, a storage battery 1a is provided as the DC power supply 1.

An output terminal of the power conversion device PC is connected to an output line 9 via an output line 10 and an output-side voltage transformer 8. The output line 10 is provided with an instrument current transformer 4, an output reactor 5, a filter capacitor 7, and an instrument voltage transformer 6. The instrument current transformer 4 functions as a current sensor. The instrument current transformer 4 measures output currents iu, iv, and iw of the power conversion circuit 3 and transmits the measured current values to the control device 12. The instrument voltage transformer 6 functions as a voltage sensor. The instrument voltage transformer 6 measures output voltages vuv, vvw, and vwu of the power conversion circuit 3 and transmits the measured voltage values to the control device 12. Note that the output voltage of the power conversion circuit 3 and the system voltage of the output line 9 are different in size due to the presence of the output-side voltage transformer 8, but have a correlation with each other, and have a common frequency. In the description of the first embodiment, common symbols vuv, vvw, and vwu may be given to the output voltage and the system voltage for simplification of the description.

(Configuration of Control Device)

Figure 3:
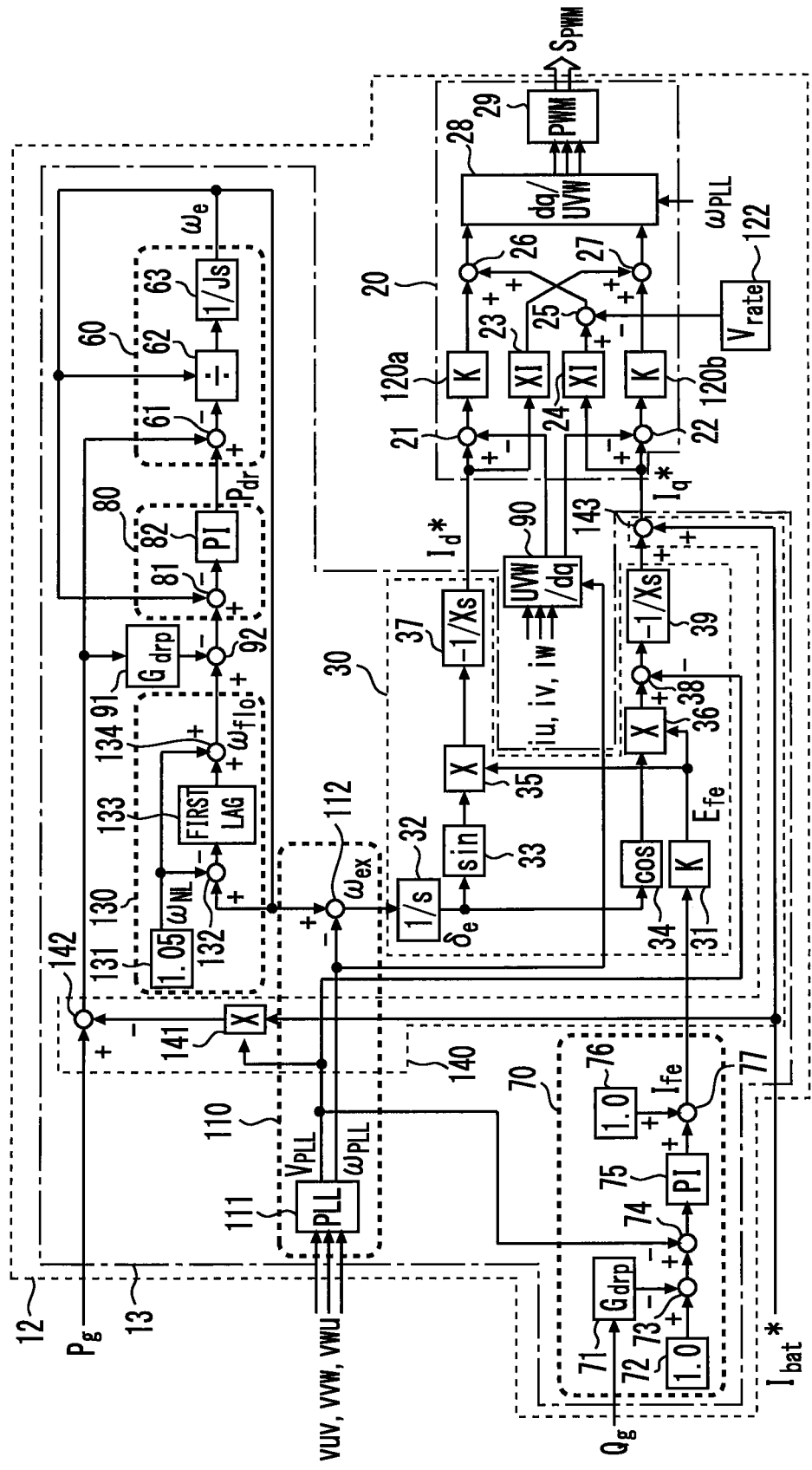
FIG. 3 is a circuit block diagram of a control device included in the power conversion device according to the first embodiment.

FIG. 3 is a circuit block diagram of the control device 12 included in the power conversion device PC according to the first embodiment. The control device 12 includes a virtual power generation device model unit 13 and a control signal generation unit 20. The virtual power generation device model unit 13 implements a virtual synchronous generator (VSG). The "virtual synchronous generator" is a model for imparting the same characteristics as the synchronous generator to the power system PS which is a distributed power supply connected to an inverter.

The active power Pg output from the power conversion circuit 3, the output voltages vuv, vvw, and vwu of the power conversion circuit 3, and a reactive power Qg output from the power conversion circuit 3 are fed back and input to the virtual power generation device model unit 13. The virtual power generation device model unit 13 generates an active current command value Iq* and a reactive current command value Id* based on these input parameters. For simplicity, the active current command value Iq* and the reactive current command value Id* may be hereinafter collectively referred to as "current command values Id* and Iq*". The virtual power generation device model unit 13 transmits the generated active current command value Iq* and reactive current command value Id* to the control signal generation unit 20. The control signal generation unit 20 generates the pulse width modulation signal $S_{PWM}$ based on the active current command value Iq*, the reactive current command value Id*, and the output current values iu, iv, and iw of the power conversion circuit 3.

The virtual power generation device model unit 13 includes a power generator model unit 30, a motor model unit 60, an AVR model unit 70, and a governor model unit 80.

The motor model unit 60 simulates a motor having a rotation shaft rotated by a steam turbine or the like. The motor model unit 60 generates a model angular velocity $\omega_e$ representing the virtual rotational velocity of the rotation shaft. To be specific, the motor model unit 60 includes an adder/subtractor 61, a division block 62, and an inertia simulation block 63.

The adder/subtractor 61 subtracts the active power Pg from a drive energy index value Pdr output from the governor model unit 80. The division block 62 outputs a torque equivalent value by dividing an output of the adder/subtractor 61 by the model angular velocity $\omega_e$. The inertia simulation block 63 receives the torque equivalent value from the division block 62 and calculates the model angular velocity $\omega_e$ by simulating the inertia of the rotation shaft using the virtual inertia Js.

The governor model unit 80 models a governor that controls the speed of the motor simulated by the motor model unit 60. The governor model unit 80 calculates a drive energy index value Pdr based on a floating command value $\omega_{flo}$ which will be described later. The drive energy index value Pdr is a value having a dimension of electric power, and is an index of drive energy supplied to the motor simulated by the motor model unit 60. To be specific, when the motor model unit 60 simulates an engine, the drive energy index value Pdr corresponds to the amount of fuel supplied to the engine.

To be specific, the governor model unit 80 includes a governor model adder/subtractor 81 and an automatic speed regulator 82. The governor model adder/subtractor 81 calculates a difference between an input value from the adder/subtractor 92 disposed in a stage preceding the governor model unit 80 and the model angular velocity $\omega_e$. The automatic speed regulator 82 receives an output of the governor model adder/subtractor 81 and outputs a drive energy index value Pdr by performing feedback by proportional integration control, that is, PI control. The automatic speed regulator 82 is also referred to as "ASR 82".

The AVR model unit 70 simulates an automatic voltage regulator that controls a field voltage of the power generator model unit 30. In the first embodiment, the AVR model unit 70 calculates a field equivalent value Ife corresponding to a field current, and transmits this field equivalent value Ife to the power generator model unit 30. The field equivalent value Ife is not limited to the field current but may be calculated as a value corresponding to the field voltage. To be specific, the AVR model unit 70 includes a droop block 71, a first predetermined value block 72, a preceding adder/subtractor 73, a following adder/subtractor 74, a proportional integration control block 75, a second predetermined value block 76, and an adder 77.

The droop block 71 outputs a value obtained by performing a predetermined operation on the reactive power Qg according to a droop gain. The first predetermined value block 72 outputs a first predetermined value which is set in advance. The preceding adder/subtractor 73 outputs a difference between the output value of the droop block 71 and the first predetermined value from the first predetermined value block 72. The following adder/subtractor 74 outputs a difference between the output value of the preceding adder/subtractor 73 and a system voltage amplitude $V_{PLL}$. The system voltage amplitude $V_{PLL}$ is a value obtained by a phase synchronization circuit 111 of an angular velocity difference acquisition unit 110 which will be described later.

The proportional integration control block 75 receives the output of the following adder/subtractor 74 and performs proportional integration control. The second predetermined value block 76 outputs a second predetermined value which is set in advance. The adder 77 adds the output value of the proportional integration control block 75 to the second predetermined value of the second predetermined value block 76. An output value from the adder 77 is the field equivalent value Ife. In the first embodiment, the first predetermined value and the second predetermined value are set to 1.0.

The power generator model unit 30 is configured to simulate a power generator driven by a motor. The power generator model unit 30 generates the active current command value Iq* and the reactive current command value Id* based on the field equivalent value Ife, the angular velocity difference $\omega_{ex}$ acquired by the angular velocity difference acquisition unit 110 which will be described later, and the output voltages vuv, vvw, and vwu of the power conversion circuit 3. To be specific, the power generator model unit 30 includes a proportional block 31, an integration block 32, a d-axis conversion unit 33, a q-axis conversion unit 34, a first multiplication block 35, a second multiplication block 36, a first synchronous reactance unit 37, an adder/subtractor 38, and a second synchronous reactance unit 39.

The proportional block 31 receives the field equivalent value Ife from the AVR model unit 70 and performs operation using a predetermined coefficient which is set in advance on the field equivalent value Ife, thereby outputting an internal induced voltage equivalent value Efe which is a value corresponding to the internal induced voltage. The integration block 32 receives the angular velocity difference $\omega_{ex}$ acquired by the angular velocity difference acquisition unit 110, which will be described later, and integrates the angular velocity difference $\omega_{ex}$, thereby outputting a model phase δe.

The d-axis conversion unit 33 converts the model phase δe from the integration block 32 to the d-axis, thereby calculating a dimensionless first coefficient for distributing the internal induced voltage to the d-axis. The q-axis conversion unit 34 converts the model phase δe from the integration block 32 to the q-axis, thereby calculating the dimensionless second coefficient for distributing the internal induced voltage to the q-axis. The first multiplication block 35 multiplies the first coefficient output from the d-axis conversion unit 33 by the internal induced voltage equivalent value Efe. The second multiplication block 36 multiplies the second coefficient output from the q-axis conversion unit 34 by the internal induced voltage equivalent value Efe.

The first synchronous reactance unit 37 converts the voltage value to the current value on the output value of the first multiplication block 35, thereby calculating the reactive current command value Id*. The adder/subtractor 38 calculates a difference between the output value of the second multiplication block 36 and the system voltage amplitude $V_{PLL}$. The second synchronous reactance unit 39 converts the voltage value to the current value on the output value of the adder/subtractor 38, thereby calculating the active current command value Iq*.

The control signal generation unit 20 generates the pulse width modulation signal $S_{PWM}$ based on the active current command value Iq*, the reactive current command value Id*, and the output current values iu, iv, and iw of the power conversion circuit 3. To be specific, the control device 12 includes a dq conversion block 90 that performs dq conversion on the output currents iu, iv, and iw of the power conversion circuit 3. The control signal generation unit 20 generates a pulse width modulation signal based on the active current command value Iq*, the reactive current command value Id*, and an output value of the dq conversion block 90.

To be specific, the control signal generation unit 20 includes a reactive adder/subtractor 21, an active adder/subtractor 22, a first non-interference term block 23, a second non-interference term block 24, a reactive automatic current regulator 120a, an active automatic current regulator 120b, a counter voltage block 122, a feedforward adder/subtractor 25, a reactive adder 26, an active adder 27, a dq inverter block 28, and a pulse width modulation signal generation block 29.

The reactive adder/subtractor 21 determines a difference between the reactive current command value Id* and the d-axis output value of the dq conversion block 90. The active adder/subtractor 22 determines a difference between the active current command value Iq* and the q-axis output value of the dq conversion block 90. The reactive current command value Id* is input to the first non-interference term block 23. An active current command value Iq* is input to the second non-interference term block 24. The first non-interference term block 23 and the second non-interference term block 24 calculate a non-interference term for feeding forward the voltage of quadrature components when current control is performed along the dq axes.

The reactive automatic current regulator 120a is a control block configured to perform first proportional control, which uses a predetermined proportional coefficient set in advance, on the output value of the reactive adder/subtractor 21. The active automatic current regulator 120b is a control block configured to perform second proportional control, which uses a predetermined proportional coefficient set in advance, on the output value of the active adder/subtractor 22. The counter voltage block 122 outputs a counter voltage equivalent value Vrate determined so as to be equivalent to the counter voltage. In the first embodiment, the counter voltage equivalent value Vrate is determined as a fixed value such that shift from the interconnection operation to the self-sustaining operation can be made seamlessly.

The feedforward adder/subtractor 25 calculates the difference between the counter voltage equivalent value Vrate and the non-interference term output from the second non-interference term block 24. The reactive adder 26 adds the output of the reactive automatic current regulator 120a to the output of the feedforward adder/subtractor 25. The active adder 27 adds the output of the active automatic current regulator 120b to the output of the feedforward adder/subtractor 25. A system voltage angular frequency $\omega_{PLL}$ is input to the dq inverter block 28. The dq inverter block 28 performs dq inversion on the output value of the reactive adder 26 and the output value of the active adder 27. The pulse width modulation signal generation block 29 generates a pulse width modulation signal $S_{PWM}$ from the output signal from the dq inverter block 28.

In the first embodiment, the control device 12 includes the angular velocity difference acquisition unit 110, a floating command value generation unit 130, and a charge/discharge control unit 140. In the first embodiment, the control signal generation unit 20 of the control device 12 incorporates the reactive automatic current regulator 120a and the active automatic current regulator 120b. The reactive automatic current regulator 120a is also referred to as "reactive current control ACR 120a". The active automatic current regulator 120b is also referred to as "active current control ACR 120b".

(Angular Velocity Difference Acquisition Unit)

The power system PS including the power conversion device PC is connected to the output line 9 that is shared with the first external power generator 9a and the second external power generator 9b, thereby performing system interconnecting operation. At this time, it is not preferable that there is a too big difference between the frequency of the AC power output from the first external power generator 9a and the second external power generator 9b, and the output AC power frequency from the power conversion device PC. Accordingly, it is preferable to appropriately control the output AC power frequency from the power conversion circuit 3. For this reason, in the first embodiment, the angular velocity difference acquisition unit 110 calculates the angular velocity difference $\omega_{ex}$.

The angular velocity difference we, is a difference obtained by subtracting the system voltage angular frequency $\omega_{PLL}$ from the model angular velocity $\omega_e$. With the angular velocity difference acquisition unit 110, the angular velocity difference $\omega_{ex}$ of the angular velocity difference acquisition unit 110 can be included in a process for generating the active current command value Iq* and the reactive current command value Id*. Hence, the frequency of the AC power output from the power conversion circuit 3 can be accurately adjusted while considering the relationship with the frequency of the system power on the output line 9 side.

The angular velocity difference acquisition unit 110 according to the first embodiment includes a phase synchronization circuit 111 and an angular velocity adder/subtractor 112. The system voltages vuv, vvw, and vwu are input to the phase synchronization circuit 111. The phase synchronization circuit 111 outputs a system voltage amplitude $V_{PLL}$ obtained upon conversion to a rotating coordinate system, and a system voltage angular frequency $\omega_{PLL}$ obtained upon conversion to a rotating coordinate system. The angular velocity adder/subtractor 112 calculates the angular velocity difference $\omega_{ex}$. The angular velocity difference $\omega_{ex}$ is the difference between the system voltage angular frequency $\omega_{PLL}$ and the model angular velocity $\omega_e$ of the motor model unit 60. The angular velocity difference $\omega_{ex}$ is input to the integration block 32 of the power generator model unit 30. The system voltage angular frequency $\omega_{PLL}$ is input to the dq conversion block 90 and the dq inverter block 28.

(Reactive Current Control ACR and Active Current Control ACR)

If the first external power generator 9a and the second external power generator 9b drop out during the system interconnecting operation, the power system PS including the power conversion device PC needs to start the self-sustaining operation. At this time, it is preferable that switching between the system interconnecting operation and the self-sustaining operation be performed smoothly in terms of control. It is preferable to make an improvement such that switching between the system interconnecting operation and the self-sustaining operation is performed seamlessly. Accordingly, in the first embodiment, the control signal generation unit 20 incorporates the reactive current control ACR 120a and the active current control ACR 120b. The reactive current control ACR 120a and the active current control ACR 120b perform feedback control that does not involve an integral gain. The reactive current control ACR 120a and the active current control ACR 120b output the difference between the output current values iu, iv, and iw of the power conversion circuit 3 and the active current command value Iq* and the reactive current command value Id*, to the pulse width modulation signal $S_{PWM}$.

The reactive current control ACR 120a and the active current control ACR 120b provide the following advantageous effects. If the power system drops out of the system interconnecting operation while the power system PS including the power conversion device PC and the power system including the power generator are interconnected, the power system PS including the power conversion device PC may be operated independently (self-sustaining operation). The feedback control includes P control that is proportional control, PI control that is proportional integration control, PD control that is proportional differential control, and PID control that is proportional integrodifferential control.

The present inventors have found here that if feedback control involves an integral gain, even though the feedback control functions well during the system interconnecting operation, the integral gain reduces the stability of the feedback control during the self-sustaining operation. To explain this in detail, when the first external power generator 9a and the second external power generator 9b are halted during the self-sustaining operation of the power conversion device PC, only the output power of the power conversion device PC is supplied to the output line 9. Hence, during self-sustaining operation, the output power of the power conversion device PC itself becomes feedback detection values, such as the active power Pg and the reactive power Qg, and is fed back to the power conversion device PC again.

During self-sustaining operation, the power conversion device PC acts as a constant voltage supply according to the control of the AVR. The output current of the power conversion device PC is determined by the load. If the AVR for maintaining a constant output voltage of the power conversion device PC and the ACR for maintaining a constant output current are present in the same control system, and the ACR involves an integral gain, the ACR interferes with the AVR. In case of this interference, stable control cannot be achieved. In this regard, in the first embodiment, the reactive current control ACR 120a and the active current control ACR 120b are made up only of P control, and do not involve the integral gain. Therefore, feedback control may be common between the system interconnecting operation and the self-sustaining operation, providing the advantage that switching between the system interconnecting operation and the self-sustaining operation is performed seamlessly.

(Floating Command Value Generation Unit)

In the first embodiment, the DC power supply 1 is connected to the input terminal of the power conversion device PC, and the storage battery 1a is used as the DC power supply 1. Unlike the use of a solar cell or a fuel cell, which is a DC power generator, the use of the storage battery 1a for the DC power supply 1 has a unique problem in that the amount of power of the DC power supply 1 is limited. It is preferable to effectively use the limited power of the storage battery 1a.

For this reason, in the first embodiment, the power conversion device PC further includes the floating command value generation unit 130. The floating command value generation unit 130 adjusts the load of the motor model unit 60 according to a preset no-load angular velocity command value $\omega_{NL}$ and model angular velocity $\omega_e$.

With the floating command value generation unit 130, the power conversion circuit 3 does not output active power when the power supplied from the first external power generator 9a and the second external power generator 9b to the output line 9 has a predetermined steady value. With the floating command value generation unit 130, when the supply power of the output line 9 falls below the steady value due to a decrease in the output of the first external power generator 9a and the second external power generator 9b, the power conversion circuit 3 continues to replenish a reduction in the current supplied to the output line 9.

The floating command value generation unit 130 according to the first embodiment includes a no-load command value block 131, an adder/subtractor 132, a first-order lag block 133, and an adder 134. The no-load command value block 131 outputs a no-load angular velocity command value $\omega_{NL}$ which is a preset angular velocity command value obtained when no load is applied. In the first embodiment, $\omega_{NL}=1.05$ [PU] in settings. The adder/subtractor 132 calculates a difference between the no-load angular velocity command value $\omega_{NL}$ and the model angular velocity $\omega_e$. Since the model angular velocity $\omega_e$ has the same value as or a value lower than the no-load angular velocity command value $\omega_{NL}$, the difference output from the adder/subtractor 132 is zero or a negative value. The first-order lag block 133 outputs a value obtained by performing a first-order lag process based on a predetermined time constant set in advance, on the difference value calculated by the adder/subtractor 132. The adder 134 outputs a value obtained by adding the output of the first-order lag block 133 to the no-load angular velocity command value $\omega_{NL}$ as a floating command value $\omega_{flo}$. Hence, the difference between the no-load angular velocity command value $\omega_{NL}$ and the model angular velocity $\omega_e$ passes through the first-order lag block 133 and is thus included in the no-load angular velocity command value $\omega_{NL}$ with a time lag.

The virtual power generation device model unit 13 according to the first embodiment includes a droop block 91 and an adder/subtractor 92. The droop block 91 outputs a value obtained by performing a predetermined operation on the active power Pg fed back and input, in accordance with a preset droop gain. The adder/subtractor 92 calculates a difference between the output value of the droop block 91 and the floating command value $\omega_{flo}$. The adder/subtractor 92 is disposed in a stage preceding the governor model unit 80. The difference calculated by the adder/subtractor 92 is transmitted to the governor model adder/subtractor 81 included in the governor model unit 80. Note that the no-load angular velocity command value $\omega_{NL}$ and the droop gain of the droop block 91 are set as a set of values that satisfy a certain relationship.

An operation of the floating command value generation unit 130 will be described in chronological steps for convenience of explanation. In the first step, the first external power generator 9a and the second external power generator 9b generate power normally, and the output line 9 is supplied with scheduled power. At this time, suppose that the power conversion device PC does not output a current, and the active power Pg is zero. Additionally, suppose that no load is applied to the motor model unit 60, and the model angular velocity $\omega_e$ coincides with the no-load angular velocity command value $\omega_{NL}$.

In the second step, the output currents of the first external power generator 9a and the second external power generator 9b decrease due to an abnormality in the first external power generator 9a and the second external power generator 9b. In the third step, the power conversion device PC starts outputting a current in response to the decrease in the output current in the second step. To be specific, in the steady state, the power conversion device PC is connected to the output line 9 at a constant output voltage although a current is not output, such that the power conversion device PC starts outputting a current in response to a decrease in the output current in the second step.

In the fourth step, a value of the active power Pg increases as the output current of the power conversion device PC increases, such that the active power Pg input to the motor model unit 60 increases. In the fifth step, it is determined that the load of the motor model unit 60 has substantially increased due to the increase in the active power Pg, such that the model angular velocity $\omega_e$ of the motor model unit 60 decreases. In the sixth step, a decrease in the model angular velocity $\omega_e$ is transmitted to the floating command value generation unit 130. Here, for convenience of explanation, suppose that the model angular velocity $\omega_e$ is initially 1.05, which is the same as the no-load angular velocity command value $\omega_{NL}$, and the model angular velocity $\omega_e$ has decreased to 1.00 due to the fifth step. In other words, suppose that the model angular velocity $\omega_e$ has been decreased by 0.05.

In the seventh step, with a decrease in the model angular velocity $\omega_e$, the output of the adder/subtractor 132 changes stepwise from 0 to −0.05. Even if the output of the adder/subtractor 132 exhibits a step-like decrease, the first-order lag process by the first-order lag block 133 smooths the step-like decrease in the time direction. In other words, the output of the first-order lag block 133 gradually decreases from 0 to −0.05. The adder 134 adds the output of the first-order lag block 133 to the no-load angular velocity command value $\omega_{NL}$. The output of the adder 134, that is, the floating command value $\omega_{flo}$ gradually decreases from 1.05 to 1.00 according to a predetermined time constant.

During the process of the first to seventh steps, the floating command value generation unit 130 and the governor model unit 80 operate in cooperation as described below. As the floating command value $\omega_{flo}$ gradually decreases from 1.05, the input value of the governor model adder/subtractor 81 also gradually decreases from when no load is applied. Since a gradual decrease is made by a first-order lag element, immediately after the sixth step, the floating command value $\omega_{flo}$ is larger than the current model angular velocity $\omega_e$. In other words, immediately after the sixth step, even if the current model angular velocity $\omega_e$ is 1.00, the floating command value $\omega_{flo}$ has only decreased from 1.05 to, for example, 1.04. At this time, the difference between the floating command value $\omega_{flo}$ and the model angular velocity $\omega_e$ is increased by 0.04, and a value corresponding to this difference is input to the governor model adder/subtractor 81. The governor model adder/subtractor 81 transmits a positive value, which corresponds to the difference, to the ASR 82. The ASR 82 calculates an output value having a power dimension in accordance with the positive input value from the governor model adder/subtractor 81. At this time, the ASR 82 exhibits a speed adjusting function of increasing the model angular velocity $\omega_e$ so as to compensate for the decrease in the model angular velocity $\omega_e$ of the power generator model unit 30.

The motor model unit 60 calculates the latest model angular velocity $\omega_e$ through a series of predetermined arithmetic operations performed by the adder/subtractor 61, the division block 62, and the inertia simulation block 63 based on the output value from the ASR 82. The latest model angular velocity $\omega_e$ is fed back to the floating command value generation unit 130 again. After repetition of these control operations, a point in time at which the floating command value $\omega_{flo}$ and the model angular velocity we coincide with each other comes. When this point in time comes, the output of the governor model adder/subtractor 81 becomes zero.

When the output of the governor model adder/subtractor 81 becomes zero, the input value of the ASR 82 becomes zero, such that the ASR 82 can determine that the adjustment of the speed of the motor model unit 60 has been completed. Consequently, the internal control process for the control device 12 becomes a steady state while the power conversion device PC outputs the insufficient current; thus, the power conversion device PC can maintain an output current for compensating for the current shortage caused by the second step.

With the floating command value generation unit 130 described above, "backup current control" can be achieved. With the backup current control, when the first external power generator 9a and the second external power generator 9b operate normally, the power conversion device PC does not output a current, and in a case of a drop in the output power due to dropout or the like of the first external power generator 9a and the second external power generator 9b, the power conversion device PC replenishes the insufficient current. The power stored in the storage battery 1a is limited and the available active power is limited when the power conversion device PC is connected to the storage battery 1a. With the above-mentioned backup current control, the limited power of the storage battery 1a can be effectively used.

(Charge/Discharge Control Unit)

In a case the power of the storage battery 1a drops, the virtual power generation device model unit 13 is preferably configured such that the storage battery 1a can be charged as needed. Accordingly, in the first embodiment, the virtual power generation device model unit 13 is configured to receive the charge/discharge current control signal $I_{bat*}$. In the first embodiment, the virtual power generation device model unit 13 activates the charge/discharge control unit 140 upon reception of the charge/discharge current control signal $I_{bat*}$. The charge/discharge control unit 140 corrects the active current command value Iq* generated in the power generator model unit 30. A negative current value as the charge/discharge current control signal $I_{bat*}$ is added to the active current command value Iq*.

To be specific, the charge/discharge control unit 140 includes a multiplication block 141, a charge/discharge power adder/subtractor 142, and a charge/discharge current adder 143. The multiplication block 141 calculates the charge/discharge power by multiplying the system voltage amplitude $V_{PLL}$ by the charge/discharge current control signal $I_{bat*}$ of the charge/discharge control unit 140 which will be described later. The charge/discharge power adder/subtractor 142 subtracts the charge/discharge power from the multiplication block 141 from the active power Pg. The charge/discharge current adder 143 is disposed between the power generator model unit 30 and the control signal generation unit 20. The charge/discharge current adder 143 adds the charge/discharge current control signal $I_{bat*}$ to the active current command value Iq*.

In the first embodiment, the correction by the charge/discharge current adder 143 corrects the active current command value Iq* to a negative value such that the current flows backward from the output line 9 via the power conversion circuit 3. The charge/discharge control unit 140 transmits the corrected active current command value Iq* to the control signal generation unit 20. With the charge/discharge control unit 140, current flowing from the power conversion circuit 3 to the DC power supply 1 can be generated according to the charge/discharge current control signal $I_{bat*}$. This current can be used as a charging current for "charging" of the storage battery 1a.

Moreover, in the first embodiment, since charge/discharge power is subtracted from the active power Pg by the charge/discharge power adder/subtractor 142, the active power Pg input to the motor model unit 60 can be kept constant. Accordingly, even if the charge/discharge control unit 140 operates, the influence on the motor model unit 60 is canceled, and the model angular velocity $\omega_e$ is kept constant. This makes it possible to generate a charging current for the storage battery 1a while keeping the motor model unit 60 in the steady operation. When a positive current value is added to the active current command value Iq* through the charge/discharge current control signal $I_{bat*}$, "discharge" for discharging the power stored in the storage battery 1a can be performed, contrary to the above operation.

[Modification of the First Embodiment]

One power conversion device PC should not necessarily include all of the following aforementioned units: the "angular velocity difference acquisition unit 110", the "reactive current control ACR 120a and active current control ACR 120b", the "floating command value generation unit 130", and the "charge/discharge control unit 140". First to fourth modifications will be described as basic modifications. In the first modification, the power conversion device PC according to the first embodiment may include the "angular velocity difference acquisition unit 110", and does not necessarily include the "reactive current control ACR 120a and active current control ACR 120b", the "floating command value generation unit 130" and the "charge/discharge control unit 140". This first modification corresponds to the "first power conversion device" in "Solution to Problem" mentioned above. For the first modification, any one or any two of the following units may be combined: the "reactive current control ACR 120a and active current control ACR 120b", the "floating command value generation unit 130", and the "charge/discharge control unit 140".

In the second modification, the power conversion device PC according to the first embodiment may include the "reactive current control ACR 120a and active current control ACR 120b", and does not necessarily include the "angular velocity difference acquisition unit 110", the "floating command value generation unit 130" and the "charge/discharge control unit 140". This second modification corresponds to the "second power conversion device" in "Solution to Problem" mentioned above. For the second modification, any one or any two of the following units may be combined: the "angular velocity difference acquisition unit 110", the "floating command value generation unit 130", and the "charge/discharge control unit 140". Note that, depending on the combination, the further modification of the first modification described above may have the same circuit structure as the further modification of the second modification described here.

In the third modification, the power conversion device PC according to the first embodiment may include the "floating command value generation unit 130", and does not necessarily include the "angular velocity difference acquisition unit 110", the "reactive current control ACR 120a and active current control ACR 120b" and the "charge/discharge control unit 140". This third modification corresponds to the "third power conversion device" in "Solution to Problem" mentioned above. For the third modification, any one or any two of the following units may be combined: the "angular velocity difference acquisition unit 110", the "reactive current control ACR 120a and active current control ACR 120b", and the "charge/discharge control unit 140". Note that, depending on the combination, the further modification of the first modification described above and the further modification of the second modification may have the same circuit structure as the further modification of the third modification described here.

Figure 4:
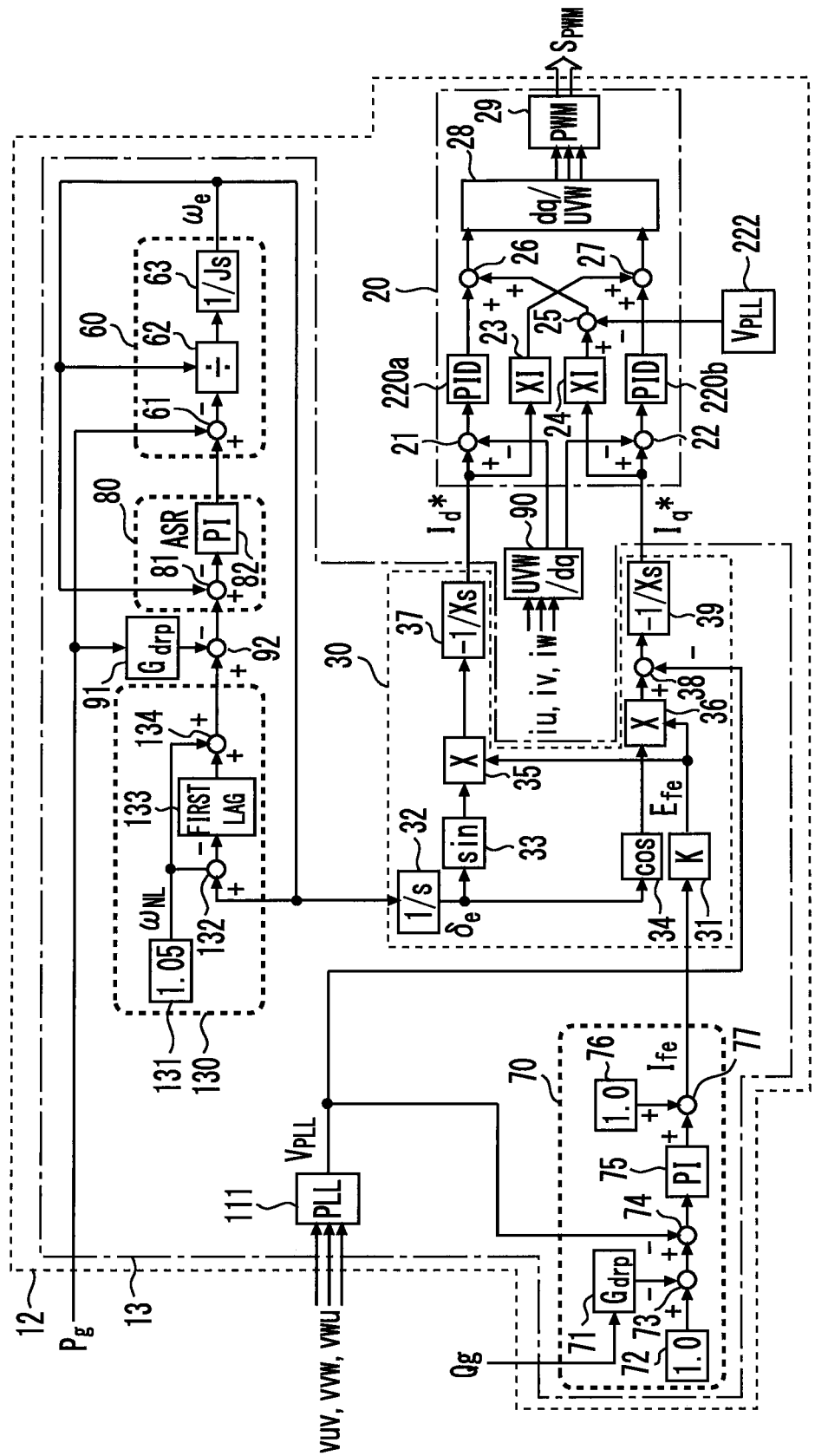
FIG. 4 is a circuit block diagram of the control device included in the power conversion device according to a modification of the first embodiment.

FIG. 4 is a circuit block diagram of the control device 12 included in the power conversion device PC according to a modification of the first embodiment. FIG. 4 shows the third modification described above. The modification shown in FIG. 4 is obtained by removing the angular velocity difference acquisition unit 110, the reactive current control ACR 120a, the active current control ACR 120b, and the charge/discharge control unit 140 from the control device 12 shown in FIG. 3. Instead of the reactive current control ACR 120a and the active current control ACR 120b, PID control ACRs 220a and 220b involving an integral gain are provided.

In the control device 12 shown in FIG. 4, the counter voltage block 122 is removed from the control device 12 shown in FIG. 3, and a system voltage block 222 is provided instead. The system voltage amplitude $V_{PLL}$ of the system voltage block 222 is fed to the feedforward adder/subtractor 25. The components of the angular velocity difference acquisition unit 110 are removed, while the phase synchronization circuit 111 remains. Note that the phase synchronization circuit 111 does not output the system voltage angular frequency $\omega_{PLL}$, but outputs only the system voltage amplitude $V_{PLL}$. The PID control ACRs 220a and 220b may be modified to a PI control ACR that performs PI feedback control involving an integral gain.

In the fourth modification, the power conversion device PC according to the first embodiment may include the "charge/discharge control unit 140", and does not necessarily include the "angular velocity difference acquisition unit 110", the "reactive current control ACR 120a and active current control ACR 120b" and the "floating command value generation unit 130". This fourth modification corresponds to the "fourth power conversion device" in "Solution to Problem" mentioned above. For the fourth modification, any one or any two of the following units may be combined: the "angular velocity difference acquisition unit 110", the "reactive current control ACR 120a and active current control ACR 120b", and the "floating command value generation unit 130". Note that, depending on the combination, the further modifications of the first to third modifications described above may have the same circuit structure as the further modification of the fourth modification described here.

Figure 5:
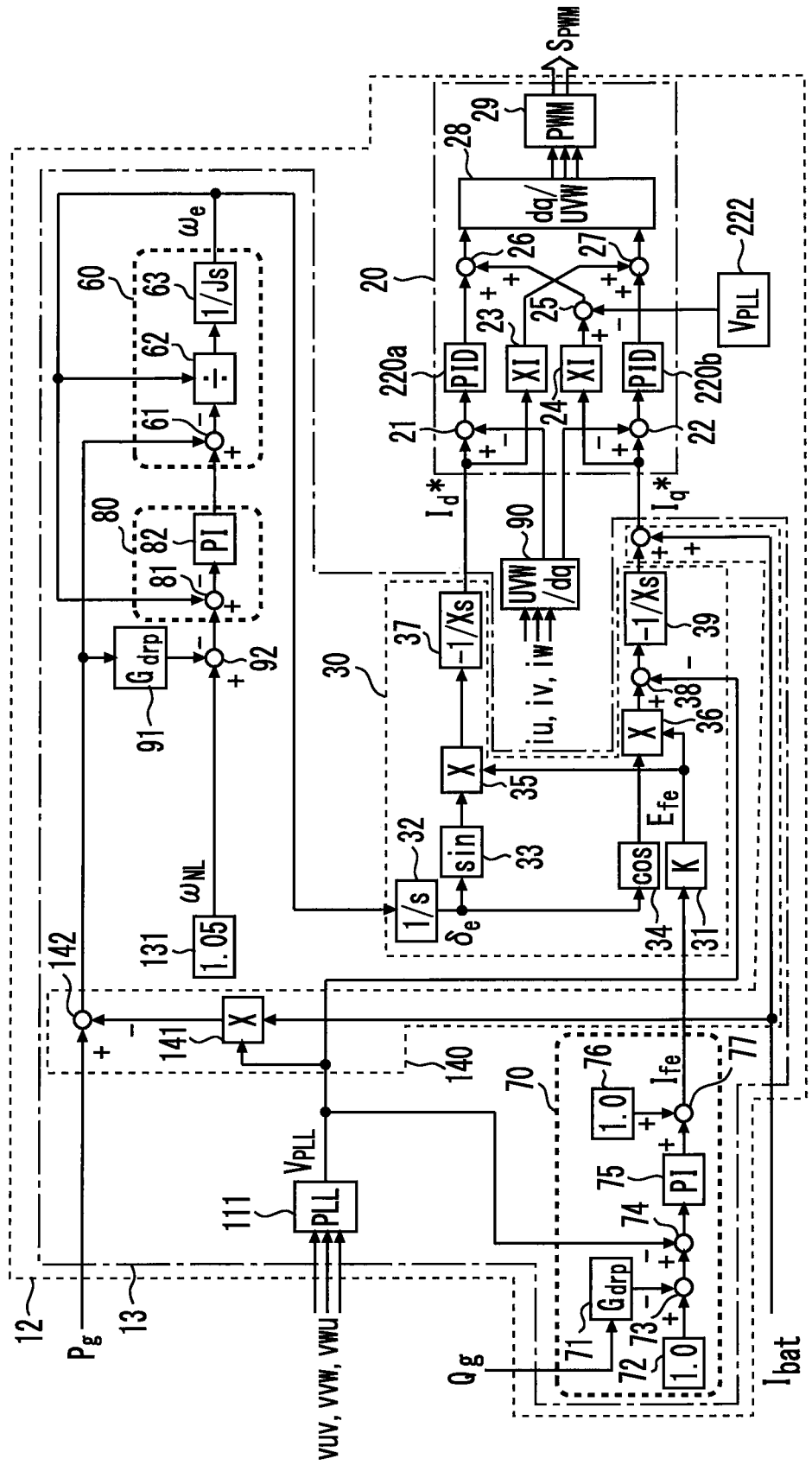
FIG. 5 is a circuit block diagram of the control device included in the power conversion device according to a modification of the first embodiment.

FIG. 5 is a circuit block diagram of the control device 12 included in the power conversion device PC according to a modification of the first embodiment. FIG. 5 shows the fourth modification described above. The modification shown in FIG. 5 is obtained by removing the angular velocity difference acquisition unit 110, the reactive current control ACR 120a, the active current control ACR 120b, and the floating command value generation unit 130 from the control device 12 shown in FIG. 3. The components of the floating command value generation unit 130 are removed, while the no-load command value block 131 remains. Note that the no-load angular velocity command value $\omega_{NL}$ of the no-load command value block 131 is directly input to the adder/subtractor 92.

Second Embodiment

Figure 6:
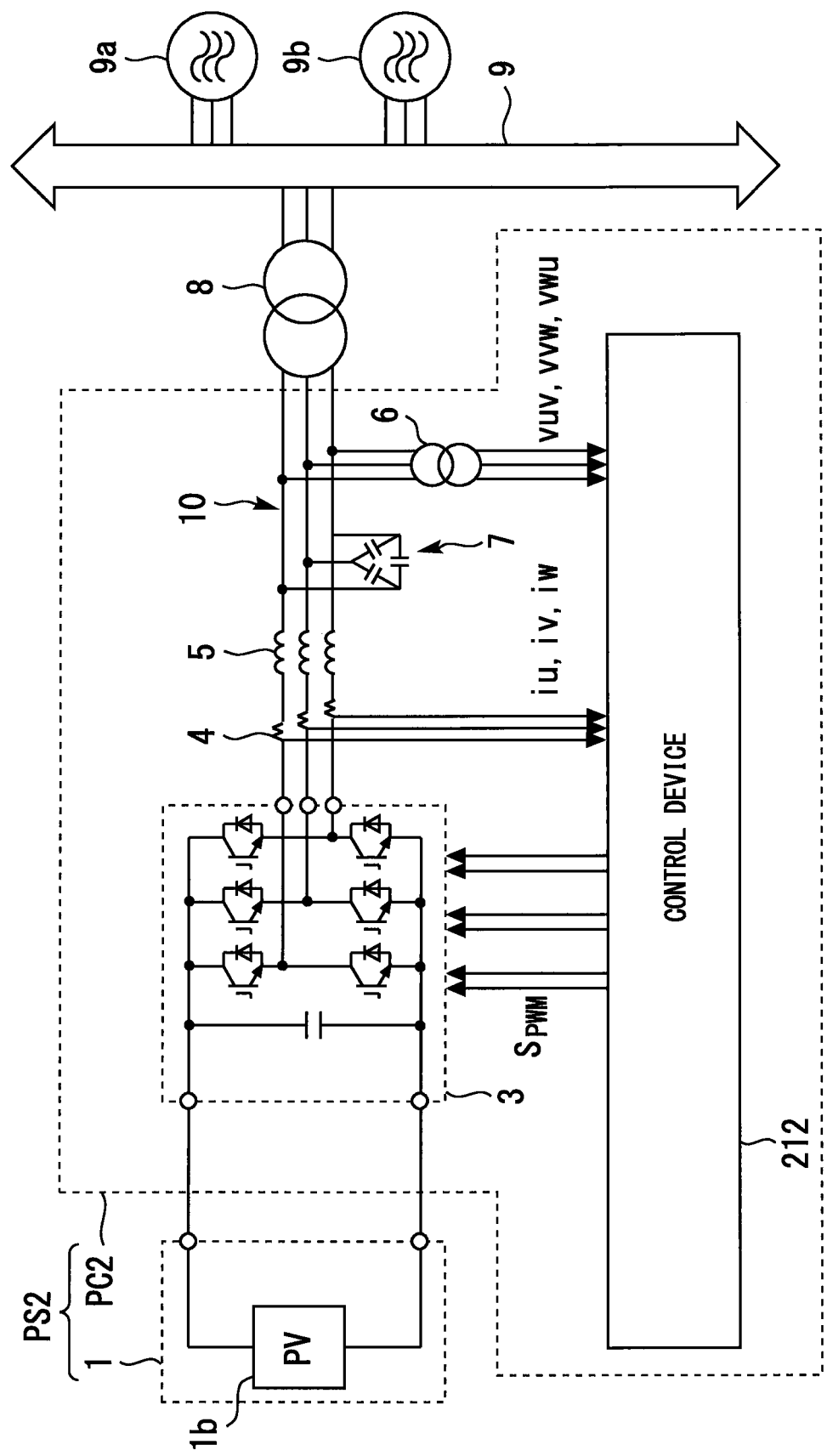
FIG. 6 is a circuit block diagram of the control device included in the power conversion device according to a modification of the first embodiment.

In the following description, the same or equivalent components in the first embodiment and a second embodiment are given the same reference numerals for description. In the second embodiment, differences from the first embodiment will be mainly described, and description of common subjects will be simplified or omitted. FIG. 6 is a circuit diagram showing a power system PS2 including a power conversion device PC2 according to the second embodiment. In the second embodiment, the DC power supply 1 includes a solar cell 1b instead of the storage battery 1a.

Figure 7:
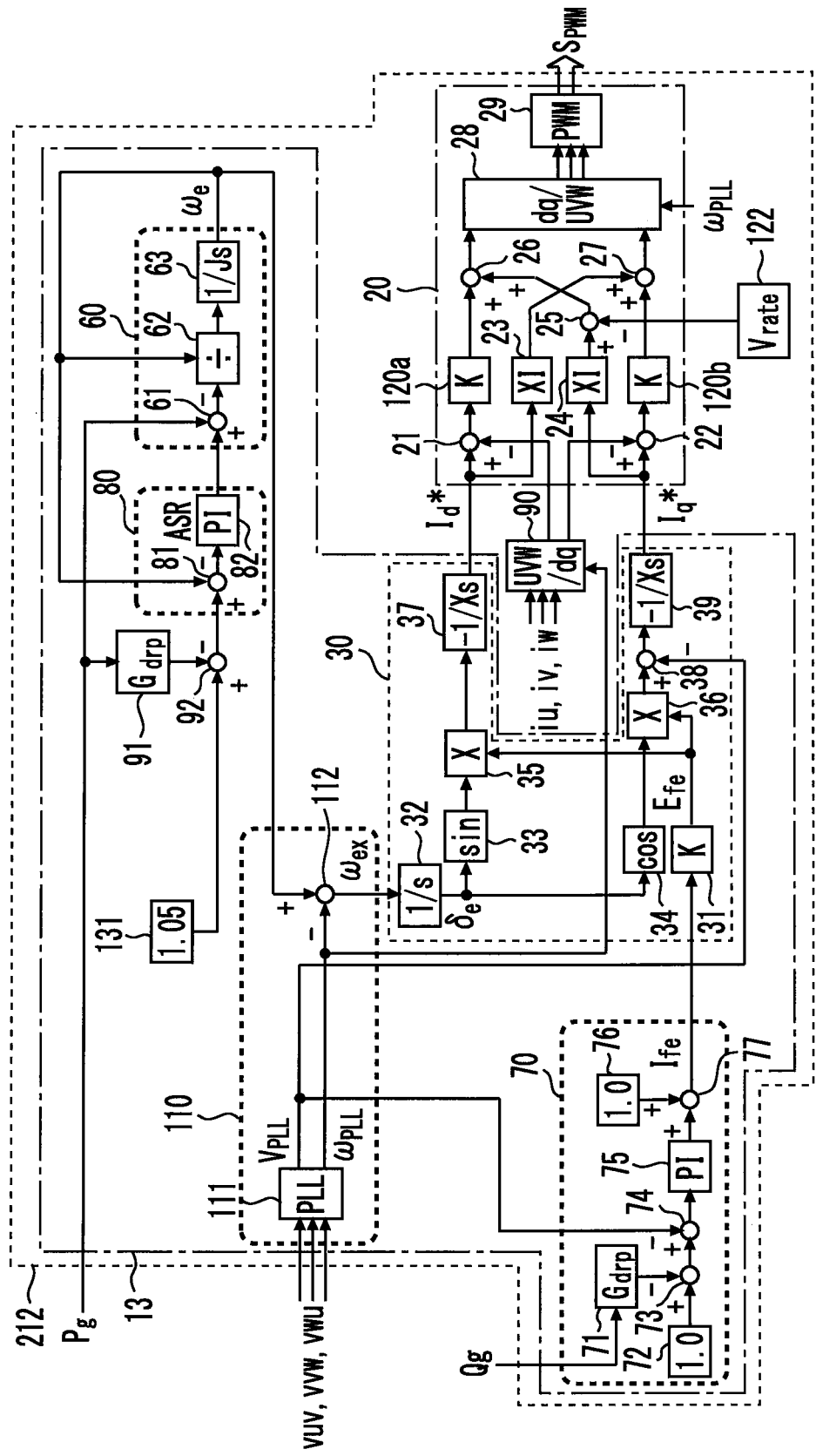
FIG. 7 is a circuit block diagram of the control device included in the power conversion device according to a second embodiment.

FIG. 7 is a circuit block diagram of the control device 212 included in the power conversion device PC2 according to the second embodiment. The control device 212 shown in FIG. 7 is obtained by removing the floating command value generation unit 130 and the charge/discharge control unit 140 from the control device 12 shown in FIG. 3. Since the floating command value generation unit 130 is not provided, the power conversion device PC2 outputs active power to the output line 9 in the steady operation state. In other words, the power conversion device PC2 behaves as a power generator similarly to the first external power generator 9a and the second external power generator 9b. Since the solar cell 1b is used instead of the storage battery 1a, continuous power generation with sunlight is achievable. Therefore, the power conversion device PC2 can simulate not a backup power supply but one power generator that outputs a current in the steady operation.

Figure 8:
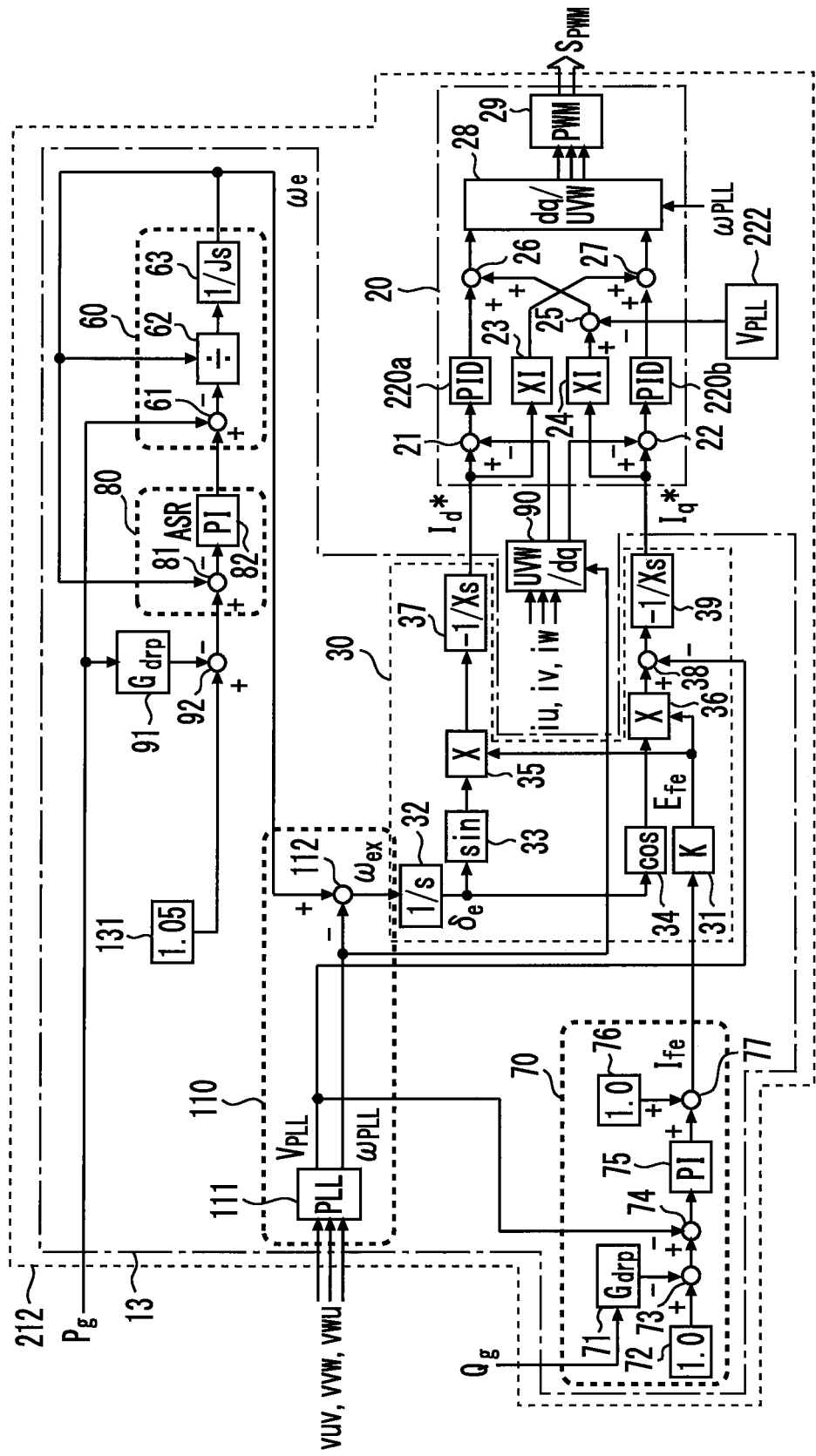
FIG. 8 is a circuit block diagram of the control device included in the power conversion device according to a modification of the second embodiment.

FIG. 8 is a circuit block diagram of the control device 212 included in the power conversion device PC2 according to a modification of the second embodiment. In the modification shown in FIG. 8, the reactive current control ACR 120a and the active current control ACR 120b are removed from the control device 212 shown in FIG. 7, and PI control ACRs 220a and 220b involving an integral gain are provided instead of these components. It is similar to the modification of the first embodiment shown in FIG. 4. Further, the counter voltage block 122 is omitted, and a system voltage block 222 is provided. The system voltage amplitude $V_{PLL}$ of the system voltage block 222 is fed to the feedforward adder/subtractor 25. The PID control ACRs 220a and 220b may be modified to a PI control ACR that performs PI feedback control involving an integral gain.

Figure 9:
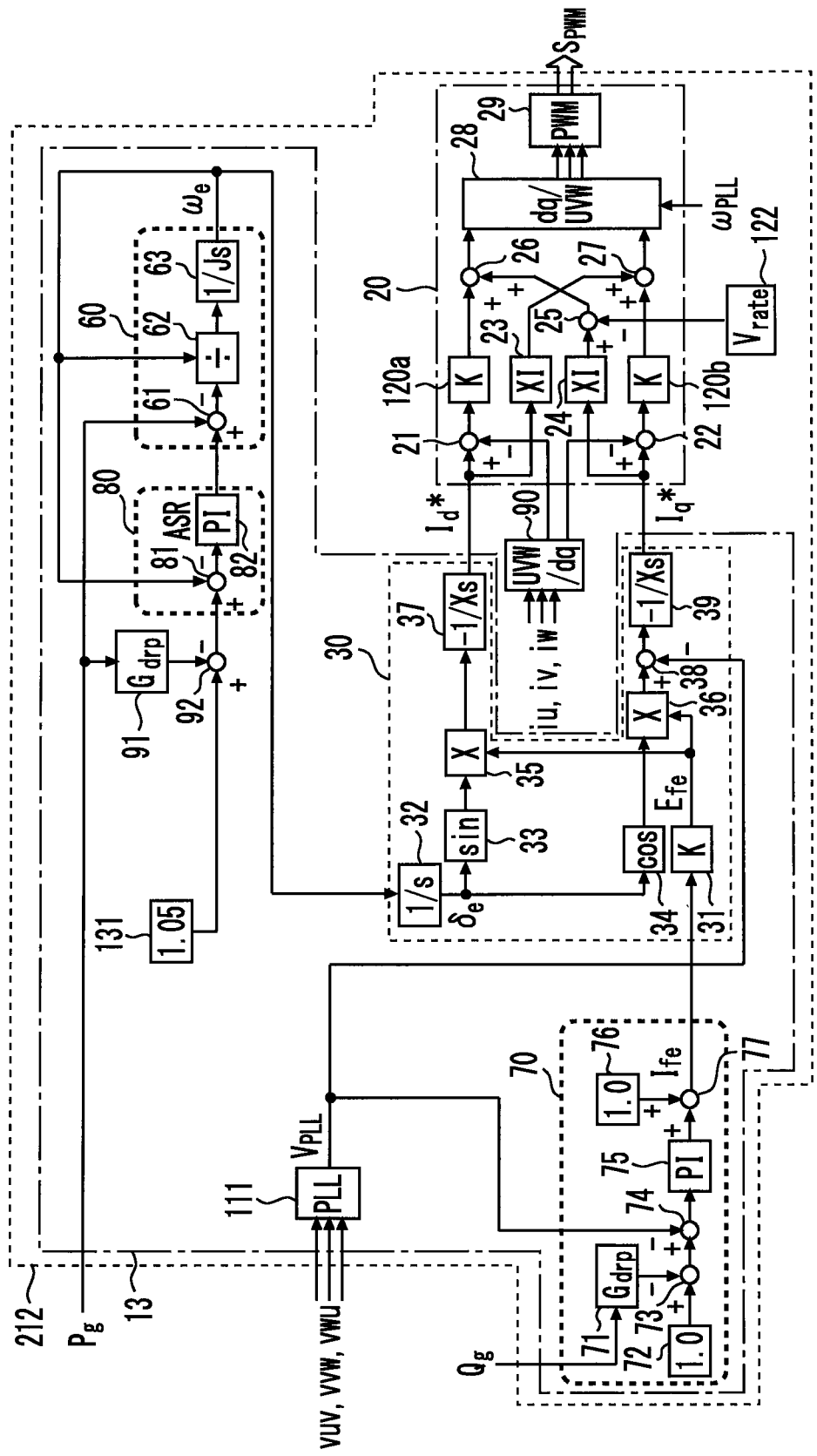
FIG. 9 is a circuit block diagram of the control device included in the power conversion device according to a modification of the second embodiment.

FIG. 9 is a circuit block diagram of the control device 212 included in the power conversion device PC2 according to a modification of the second embodiment. The modification shown in FIG. 9 is obtained by removing the angular velocity difference acquisition unit 110 from the control device 212 shown in FIG. 7.

Instead of the solar cell 1b, another DC power generator may be provided. A fuel cell may be provided as the other DC power generator instead of the solar cell 1b. A wind power generation system that outputs DC power may be provided as the other DC power generator instead of the solar cell 1b. The wind power generation system includes a blade that receives wind, a power transmission shaft that transmits rotation of the blade, a power generator coupled to the power transmission shaft, and a power conversion device that converts AC power generated by the power generator into DC power.

The control operations performed by the power conversion device PC according to the first embodiment and the power conversion device PC2 according to the second embodiment described above may be provided as a power conversion method. Even in the use as the power conversion method, as described in the modifications of Embodiments 1 and 2, the control operations performed in the "angular velocity difference acquisition unit 110", the "reactive current control ACR 120a and active current control ACR 120b", the "floating command value generation unit 130", and the "charge/discharge control unit 140" may be independently used as the power conversion method. Alternatively, two or more of these control operations may be combined for use as the power conversion method.

REFERENCE SIGNS LIST

PS, PS2 Power system PC, PC2 Power conversion device 1 DC power supply 1a Storage battery 1b Solar cell 2 Host device 3 Power conversion circuit 4 Instrument current transformer 5 Output reactor 6 Instrument voltage transformer 7 Filter capacitor 8 Output-side voltage transformer 9 Output line 9a First external power generator 9b Second external power generator 10 Output line 11 Load 12, 212 Control device 13 Virtual power generation device model unit 20 Control signal generation unit 21 Reactive adder/ subtractor 22 Active adder/subtractor 23 First non-interference term block 24 Second non-interference term block 25 Feedforward adder/subtractor 26 Reactive adder 27 Active adder 28 dq inverter block 29 Pulse width modulation signal generation block 30 Power generator model unit 31 Proportional block 32 Integration block 33 d-axis conversion unit 34 q-axis conversion unit 35 First multiplication block 36 Second multiplication block 37 First synchronous reactance unit 38 Adder/subtractor 39 Second synchronous reactance unit 60 Motor model unit 61 Adder/subtractor 62 Division block 63 Inertia simulation block 70 AVR model unit 71 Droop block 72 First predetermined value block 73 Preceding adder/subtractor 74 Following adder/subtractor 75 Proportional integration control block 76 Second predetermined value block 77 Adder 80 Governor model unit 81 Governor model adder/subtractor 82 Automatic speed regulator (ASR) 90 dq conversion block 91 Droop block 92 Adder/subtractor 110 Angular velocity difference acquisition unit 111 Phase synchronization circuit 112 Angular velocity adder/subtractor 120a Reactive automatic current regulator (Reactive current control ACR) 120b Active automatic current regulator (Active current control ACR) 122 Counter voltage block 130 Floating command value generation unit 131 No-load command value block 132 Adder/subtractor 133 First-order lag block 134 Adder 140 Charge/discharge control unit 141 Multiplication block 142 Charge/discharge power adder/subtractor 143 Charge/discharge current adder 222 System voltage block Efe Voltage equivalent value $I_{bat*}$ Charge/discharge current control signal Id* Current command value (Reactive current command value) Ife Field equivalent value Iq* Current command value (Reactive current command value) Js Virtual inertia Pdr Drive energy index value Pg Active power Qg Reactive power $S_{PWM}$ Pulse width modulation signal $V_{PLL}$ System voltage amplitude Vrate Counter voltage equivalent value vuv, vvw, vwu Output voltage (System voltage) 6e Model phase $\omega_e$ Model angular velocity $\omega_{ex}$ Angular velocity difference $\omega_{flo}$ Floating command value $\omega_{NL}$ No-load angular velocity command value $\omega_{PLL}$ System voltage angular frequency

The invention claimed is:

1. A power conversion device comprising:
a power conversion circuit that is present between a DC power supply and an output line and converts DC power from the DC power supply to output AC power to the output line; and
a control device that outputs a pulse width modulation signal to the power conversion circuit, the pulse width modulation signal being used for switching control in the power conversion circuit,
wherein the control device comprises:
a virtual power generation device model unit; and
a control signal generation unit;
wherein the virtual power generation device model unit comprises:
a motor model unit configured to simulate a motor having a rotation shaft, and configured to generate a model angular velocity representing a virtual rotational velocity of the rotation shaft;
an AVR model unit configured to simulate an automatic voltage regulator, and configured to calculate a field equivalent value that is a value equivalent to a field current or a field voltage;
an angular velocity difference acquisition unit configured to calculate an angular velocity difference that is a difference between an angular frequency of an output voltage of the power conversion circuit and the model angular velocity; and
a power generator model unit configured to generate a current command value for simulating a power generator driven by the motor, based on the field equivalent value, the angular velocity difference, and an output voltage of the power conversion circuit,
wherein the control signal generation unit is configured to generate the pulse width modulation signal based on the current command value and an output current value from the power conversion circuit.

2. The power conversion device according to claim 1, wherein the control signal generation unit is further configured to feed back a difference between the output current value of the power conversion circuit and the current command value, to the pulse width modulation signal by feedback control that does not involve an integral gain.

3. The power conversion device according to claim 1, wherein an external power generator is connected to the output line,
wherein the power conversion device further comprises:
a floating command value generation unit configured to output a floating command value being a command value generated such that a difference between a preset no-load angular velocity command value and the model angular velocity is included in the no-load angular velocity command value with a time delay; and
a governor model unit configured to simulate a governor that adjusts the virtual rotational velocity of the rotation shaft, and configured to calculate an index value that is an index of drive energy supplied to the motor based on the floating command value,
wherein the governor model unit calculates the index value according to the floating command value such that, when supply power supplied from the external power generator to the output line has a predetermined steady value, the power conversion circuit does not output active power, and when the supply power of the output line falls below the steady value due to a decrease in an output of the external power generator, the power conversion circuit continues to output a current corresponding to the decrease in a current from the steady value.

4. The power conversion device according to claim 1, wherein the virtual power generation device model unit is further configured to receive a current control signal, and
wherein the virtual power generation device model unit is further configured to correct the current command value generated by the power generator model unit when receiving the current control signal, thereby transmitting the current command value corrected such that a current flows backward from the output line toward the DC power supply via the power conversion circuit, to the control signal generation unit.

5. A power conversion device comprising:
a power conversion circuit that is present between a DC power supply and an output line and converts DC power from the DC power supply to output AC power to the output line; and
a control device that outputs a pulse width modulation signal to the power conversion circuit, the pulse width modulation signal being used for switching control in the power conversion circuit,
wherein the control device comprises:
a virtual power generation device model unit configured to output a current command value; and a control signal generation unit configured to generate the pulse width modulation signal based on the current command value and an output current value from the power conversion circuit,
  wherein the virtual power generation device model unit comprises:
  a motor model unit configured to simulate a motor having a rotation shaft, and configured to generate a model angular velocity representing a virtual rotational velocity of the rotation shaft;
  an AVR model unit configured to simulate an automatic voltage regulator, and configured to calculate a field equivalent value that is a value equivalent to a field current or a field voltage; and
  a power generator model unit configured to generate a current command value for simulating a power generator driven by the motor, based on the model angular velocity, the field equivalent value, and an output voltage of the power conversion circuit,
  wherein the control signal generation unit is configured to feed back a difference between an output current value of the power conversion circuit and the current command value, to the pulse width modulation signal by feedback control that does not involve an integral gain.

6. A power conversion device comprising:
a power conversion circuit that is present between a DC power supply and an output line and converts DC power from the DC power supply to output AC power to the output line; and
a control device that outputs a pulse width modulation signal to the power conversion circuit, the pulse width modulation signal being used for switching control in the power conversion circuit,
wherein the control device comprises:
a virtual power generation device model unit configured to output a current command value; and
a control signal generation unit configured to generate the pulse width modulation signal based on the current command value and an output current value from the power conversion circuit,
wherein an external power generator s connected to the output line,
  wherein the virtual power generation device model unit comprises:
  a motor model unit configured to simulate a motor having a rotation shaft, and configured to generate a model angular velocity representing a virtual rotational velocity of the rotation shaft;
  an AVR model unit configured to simulate an automatic voltage regulator, and configured to calculate a field equivalent value that is a value equivalent to a field current or a field voltage;
  a power generator model unit configured to generate a current command value for simulating a power generator driven by the motor, based on the model angular velocity the field equivalent value, and an output voltage of the power conversion circuit,
  a floating command value generation unit configured to output a floating command value being a command value generated such that a difference between a prose no-load angular velocity command value and the model angular velocity is included in the no-load angular velocity command value with a time delay; and
  a governor model unit configured to simulate a governor that adjusts the virtual rotational velocity of the rotation shaft, and configured to calculate an index value that is an index of drive energy supplied to the motor based on the floating command value,
  wherein the governor model unit calculates the index value according to the floating command value such that, when supply power supplied from the external power generator to the output line has a predetermined steady value, the power conversion circuit does not output active power, and when the supply power of the output line falls below the steady value due to a decrease in an output of the external power generator, the power conversion circuit continues to output a current corresponding to the decrease in a current from the steady value.

7. A power conversion device comprising:
a power conversion circuit that is present between a DC power supply and an output line and converts DC power from the DC power supply to output AC power to the output line; and
a control device that outputs a pulse width modulation signal to the power conversion circuit, the pulse width modulation signal being used for switching control in the power conversion circuit,
wherein the control device comprises:
a virtual power generation device model unit configured to output a current command value; and
a control signal generation unit configured to generate the pulse width modulation signal based on the current command value and an output current value from the power conversion circuit;
  wherein the virtual power generation device model unit comprises:
  a motor model unit configured to simulate a motor having a rotation shaft, and configured to output a model angular velocity representing a virtual rotational velocity of the rotation shaft;
  an AVR model unit that simulates an automatic voltage regulator, and is configured to calculate a field equivalent value that is a value equivalent to a field current or a field voltage; and
  a power generator model unit configured to generate the current command value for simulating a power generator driven by the motor, based on an output voltage of the power conversion circuit, the field equivalent value of the AVR model unit, and an angular frequency of an output voltage of the power conversion circuit,
wherein the virtual power generation device model unit is configured to receive a current control signal,
wherein the virtual power generation device model unit is configured to correct the current command value generated by the power generator model unit when receiving the current control signal, thereby transmitting the current command value corrected such that a current flows backward from the output line toward the DC power supply via the power conversion circuit, to the control signal generation unit.

8. The power conversion device according to claim 7,
wherein the motor model unit is configured to generate the model angular velocity based on active power outputted by the power conversion circuit,
wherein the power conversion device further comprises a charge/discharge power adder/subtractor configured to subtract from active power charge/discharge power based on the current control signal such that the active power input to the motor model unit is kept constant.

* * * * *